(12) United States Patent
Zhao et al.

(10) Patent No.: US 10,807,326 B2
(45) Date of Patent: *Oct. 20, 2020

(54) METHOD OF MAKING COMPLEX CARBON NANOTUBE SHEETS

(71) Applicant: Goodrich Corporation, Charlotte, NC (US)

(72) Inventors: Wenping Zhao, Glastonbury, CT (US); Zaffir A. Chaudhry, S. Glastonbury, CT (US); Galdemir Cezar Botura, Akron, OH (US); Tommy M. Wilson, Jr., Cuyahoga Falls, OH (US); Brad Hartzler, Doylestown, OH (US)

(73) Assignee: Goodrich Corporation, Charlotte, NC (US)

( * ) Notice: Subject to any disclaimer, the term of this patent is extended or adjusted under 35 U.S.C. 154(b) by 680 days.

This patent is subject to a terminal disclaimer.

(21) Appl. No.: 15/606,636

(22) Filed: May 26, 2017

(65) Prior Publication Data

US 2018/0339473 A1 Nov. 29, 2018

(51) Int. Cl.
*B29C 70/88* (2006.01)
*B64D 15/12* (2006.01)
(Continued)

(52) U.S. Cl.
CPC .............. *B29C 70/88* (2013.01); *B64D 15/12* (2013.01); *B64F 5/00* (2013.01); *C01B 32/16* (2017.08); *H05B 3/145* (2013.01); *H05B 3/34* (2013.01); *H05B 2203/011* (2013.01); *H05B 2203/017* (2013.01); *H05B 2214/02* (2013.01); *H05B 2214/04* (2013.01)

(58) Field of Classification Search
CPC ......... B29C 70/88; C01B 32/16; B64D 15/12; B64F 5/00; H05B 3/145; H05B 3/34; H05B 2203/011; H05B 2203/017; H05B 2214/02; H05B 2214/04
USPC ................ 219/553, 549, 200, 202, 552, 548
See application file for complete search history.

(56) References Cited

U.S. PATENT DOCUMENTS 9,180,979 B2 11/2015 Hallander et al.
2010/0096507 A1* 4/2010 Villinger ................ B64D 15/12
244/134 D
(Continued)

FOREIGN PATENT DOCUMENTS

DE 1020152002727 A1 7/2016
WO WO2012/092623 A2 7/2012

OTHER PUBLICATIONS

U.S. Appl. No. 15/270,993.*
Extended European Search Report for EP Application No. 18173544.0, dated Oct. 23, 2018, 8 pages.

*Primary Examiner* — Dana Ross
*Assistant Examiner* — James F Sims, III
(74) *Attorney, Agent, or Firm* — Kinney & Lange, P. A.

(57) ABSTRACT

A method of making monolithic carbon nanotube heater elements with geometric shape with multiple, complex curvatures is disclosed. The method includes depositing carbon nanotubes on to a forming surface, draining the carbon nanotubes, and drying the carbon nanotubes. Alternatively, the method includes thermoforming carbon nanotube sheets containing thermoplastic binders. The resulting carbon nanotube heater element is a thin, monolithic carbon nanotube heater sheet having a geometric shape with complex curvatures.

16 Claims, 5 Drawing Sheets

(51) Int. Cl.
*H05B 3/14* (2006.01)
*H05B 3/34* (2006.01)
*B64F 5/00* (2017.01)
*C01B 32/16* (2017.01)

(56) References Cited

U.S. PATENT DOCUMENTS

| | | | |
|---|---|---|---|
| 2012/0043415 A1* | 2/2012 | Limmack | F16L 27/1275 |
| | | | 244/1 A |
| 2012/0171411 A1* | 7/2012 | Lashmore | B32B 5/022 |
| | | | 428/114 |
| 2014/0070054 A1 | 3/2014 | Burton et al. | |
| 2015/0076137 A1* | 3/2015 | Kim | H05B 3/20 |
| | | | 219/553 |
| 2016/0221680 A1* | 8/2016 | Burton | B64D 15/12 |
| 2018/0014357 A1* | 1/2018 | Christy | H05B 3/145 |

\* cited by examiner

METHOD OF MAKING COMPLEX CARBON NANOTUBE SHEETS

BACKGROUND

An aircraft moving through the air is often subjected to ice formation, and anti-icing or de-icing devices must be used to remove or prevent ice from accumulating on exterior surfaces of the aircraft. Various types of ice protection systems have been developed to protect aircraft from the hazardous effects of icing. Electro-thermal de-icing systems typically use metal wires to melt ice by converting electrical energy to thermal energy. The use of metal wires as resistance elements embedded in de-icing systems presents several problems, including a durability of the elements, high weight, damage tolerance and power usage efficiency.

Carbon nanotube (CNT) materials have been proposed as an alternative to metal wire or foil heating elements in ice protection systems. CNTs are carbon allotropes having a generally cylindrical nanostructure. They have unusual properties that make them valuable for many different technologies. For instance, some CNTs can have high thermal and electrical conductivity, making them suitable for replacing metal heating elements. Due to their much lighter mass, substituting CNTs for metal heating components can reduce the overall weight of a heating component significantly. This makes the use of CNTs of particular interest for applications where weight is critical, such as in aerospace and aviation technologies.

Generally, CNTs are manufactured in flat sheets using non-woven paper processing techniques. However, when CNT sheets are applied to an aircraft surface for purposes such as de-icing, the CNT sheets must be cut or overlapped to fit the curve and shape of the surface. Overlap of CNT sheets affects the overall resistivity and performance of the CNT sheets as heaters.

SUMMARY

A method of making a carbon nanotube heater element includes depositing carbon nanotubes onto a forming surface that has a complex shape, draining water from the carbon nanotubes to form a carbon nanotube heater element on the forming surface, and drying the carbon nanotube heater element.

A heater element for ice protection includes a thin, monolithic carbon nanotube heater element having a geometric shape with complex curvatures.

DETAILED DESCRIPTION

Carbon nanotube (CNT) heaters can be made through non-woven paper processing techniques. However, CNT heaters with complex curvatures for application on curved aircraft parts (such as blade tip sections) can be created by using a complex forming surface as opposed to a flat belt. Utilizing a curved forming surface allows CNTs to form monolithic sheets of varying curvatures.

Figure 1:
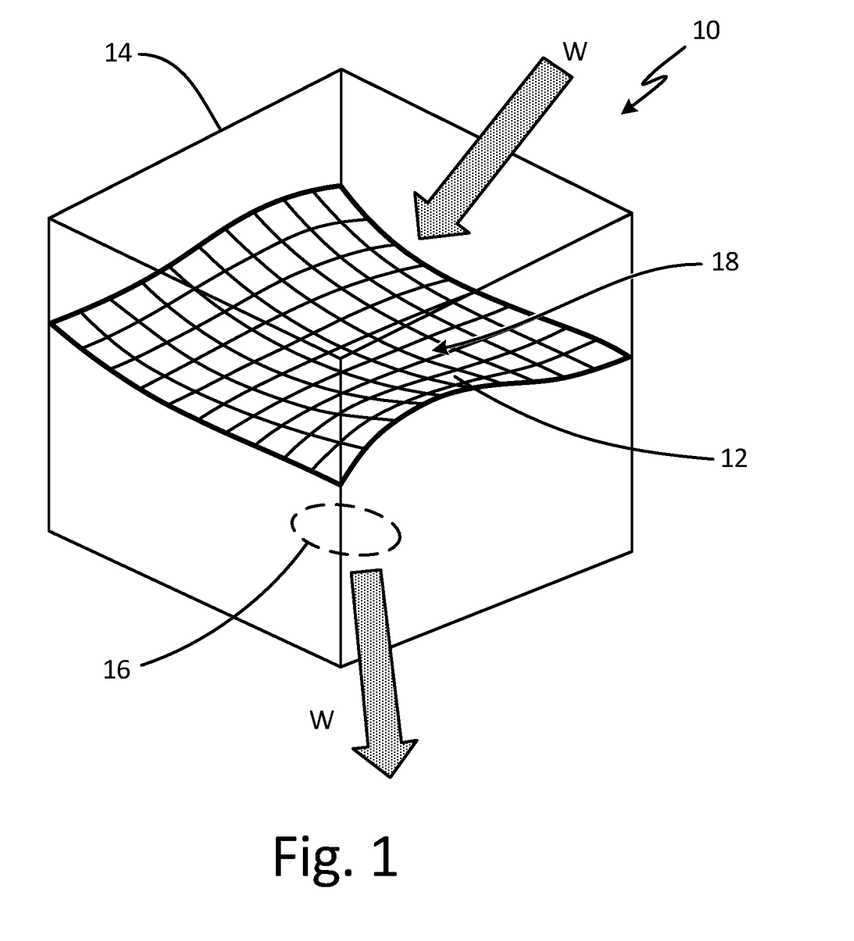
FIG. 1 is a perspective view of a system for creating complex carbon nanotube sheets.

FIG. 1 is a perspective view of apparatus 10 for creating complex carbon nanotube sheets. Apparatus 10 includes forming surface 12, walls 14, drain area 16, and carbon nanotube slurry 18.

Apparatus 10 is used for creating carbon nanotube (CNT) sheet heater elements with complex geometries, including multiple curvatures in the same monolithic sheet of uniform thickness ranging from 0.001" to about 0.020" depending on heating needs. Carbon nanotubes are both thermally and electrically conductive, thus, they are useful for ice protection purposes. Additionally, carbon nanotubes have high strength and stiffness due to underlying single chains of covalent carbon-carbon bonds in their cylindrical structure.

In general, apparatus 10 is used to create a complex CNT sheet as described in more detail with reference to FIGS. 4A and 4B. Typically, this method included mixing CNTs into an aqueous slurry, flowing resulting CNT slurry 18 into apparatus 10 on forming surface 12 between walls 14, and draining water (W) out through drain area 16. Thus, the CNTs will be deposited on forming surface 12. Subsequently, the CNTs are dried to create a complex CNT element.

Forming surface 12 of apparatus 10 is created with a complex shape reflecting a surface on which a CNT heater will be applied such as an airfoil, components in a nacelle, or other aircraft parts with multiple curvatures on one surface. Forming surface 12 is typically porous such that CNTs will not drain through forming surface 12, but water molecules will drain through forming surface 12. Forming surface 12 may be a screen or porous surface made of a porous material such as a polytetrafluoroethylene (PTFE) coated fiberglass fabric. Sometimes, apparatus 10 has walls 14 to enclose a CNT slurrys as they are being formed into CNT heaters with complex geometries. Apparatus 10 also includes drain area 16 below forming surface 12, where water (W) collects when it is drained out of a CNT slurry.

CNT slurry 18 is an aqueous slurry placed on forming surface 12. CNT slurry 18 will be formed into a CNT heater element with complex geometry. CNTs are deposited on forming surface 12 in a uniform manner such that the thickness of the final CNT heater element is uniform and typically between about 0.001" and ~0.020". After water in CNT slurry 18 is drained through forming surface 12, the CNTs are dried to produce a CNT heater with complex geometry. The complex geometry may have multiple curvatures as required by an aircraft part to which the CNT heater element will be applied, such as a radome, complex blades, vanes, engine lips, or fairings among other surfaces. Ideally, the resulting CNT heater element will have electrical resistivity between 0.005 ohms per square ($\Omega$/sq) and 3.0 $\Omega$/sq.

Figure 2:
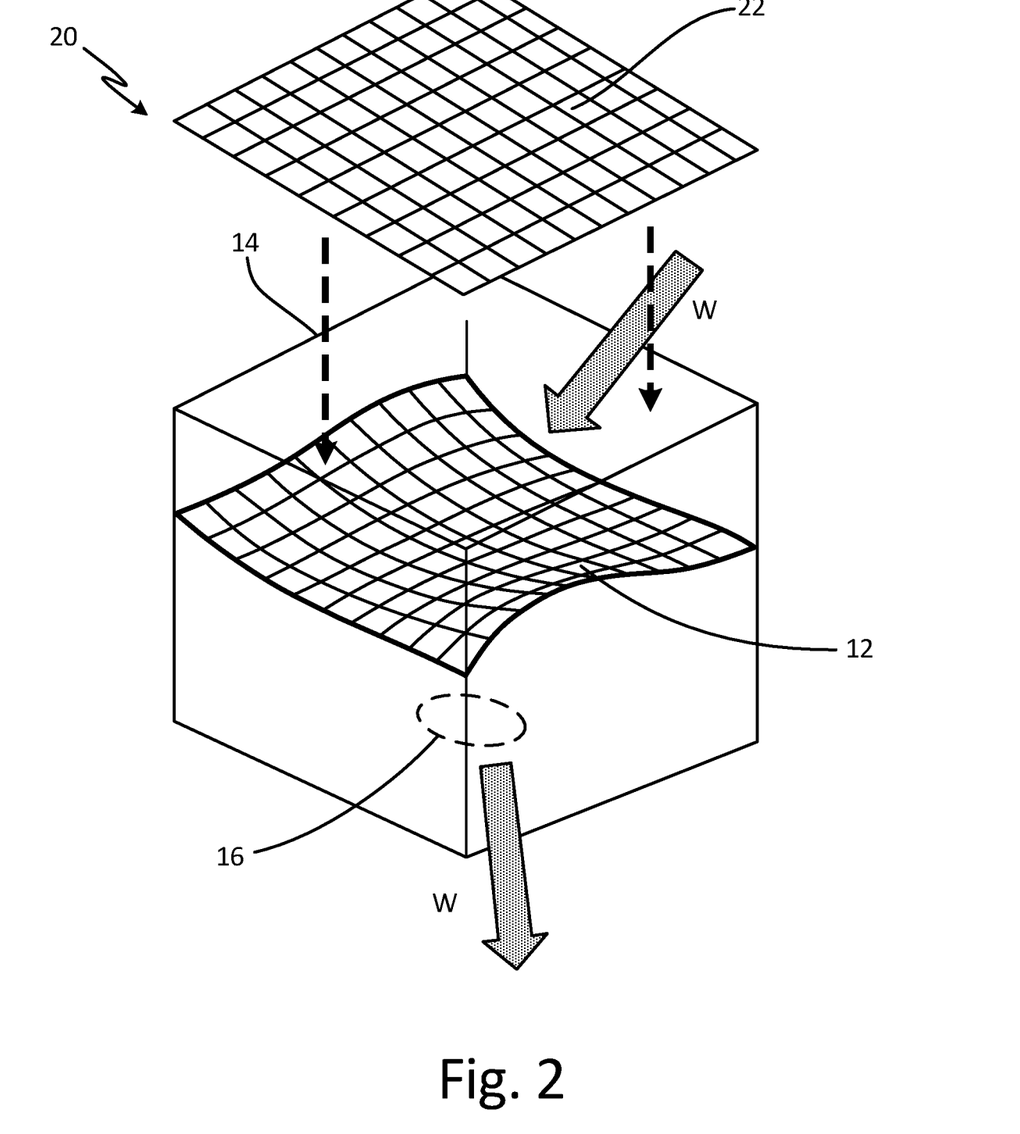
FIG. 2 is a perspective view of a system for creating complex carbon nanotube sheets in another embodiment.

Alternatively, a CNT heater element may be created as shown in FIG. 2 with a pre-made flat CNT sheet. FIG. 2 is a perspective view of apparatus 20 for creating complex carbon nanotube sheets. Similar to FIG. 1, apparatus 20 includes forming surface 12, walls 14, drain area 16, and pre-formed carbon nanotube sheet 22. The elements of apparatus 20 are the same as those in FIG. 1 unless otherwise noted.

Pre-made CNT sheet 22 is a flat sheet of carbon nanotubes placed on forming surface 12. CNT sheet 22 will be formed into a CNT heater element with complex geometry. CNT sheet 22 is deposited on forming surface 12 in a uniform manner such that the thickness of the final CNT heater element is uniform and typically between 0.001" and 0.020".

With pre-made CNT sheet 22, most of sheet 22 is already formed to curvatures required for a heater element. However, when flat CNT sheet is draped over forming surface 12, particular portions or local areas on CNT sheet 22 can be wetted such that those local areas form to curvatures of forming surface 12. This type of localized forming through wet pressing allows for minimal disruption of a woven CNT sheet.

Alternatively, CNT sheet 22 may be wetted prior to shaping on forming surface 12. Thus, water (W) is added to pre-made CNT sheet 22 on top of forming surface 12. Then, the water (W) is drained through forming surface 12, causing CNT sheet 22 to form to surface 12. Afterwards, the CNTs are dried to produce a CNT heater with complex geometry.

The complex geometry may have multiple curvatures as required by an aircraft part to which the CNT heater element will be applied, such as a radome, complex blades, vanes, engine lips, or fairings among other surfaces. Ideally, the resulting CNT heater element will have electrical resistivity between 0.005 ohms per square ($\Omega$/sq) and 3.0 $\Omega$/sq.

Figure 3:
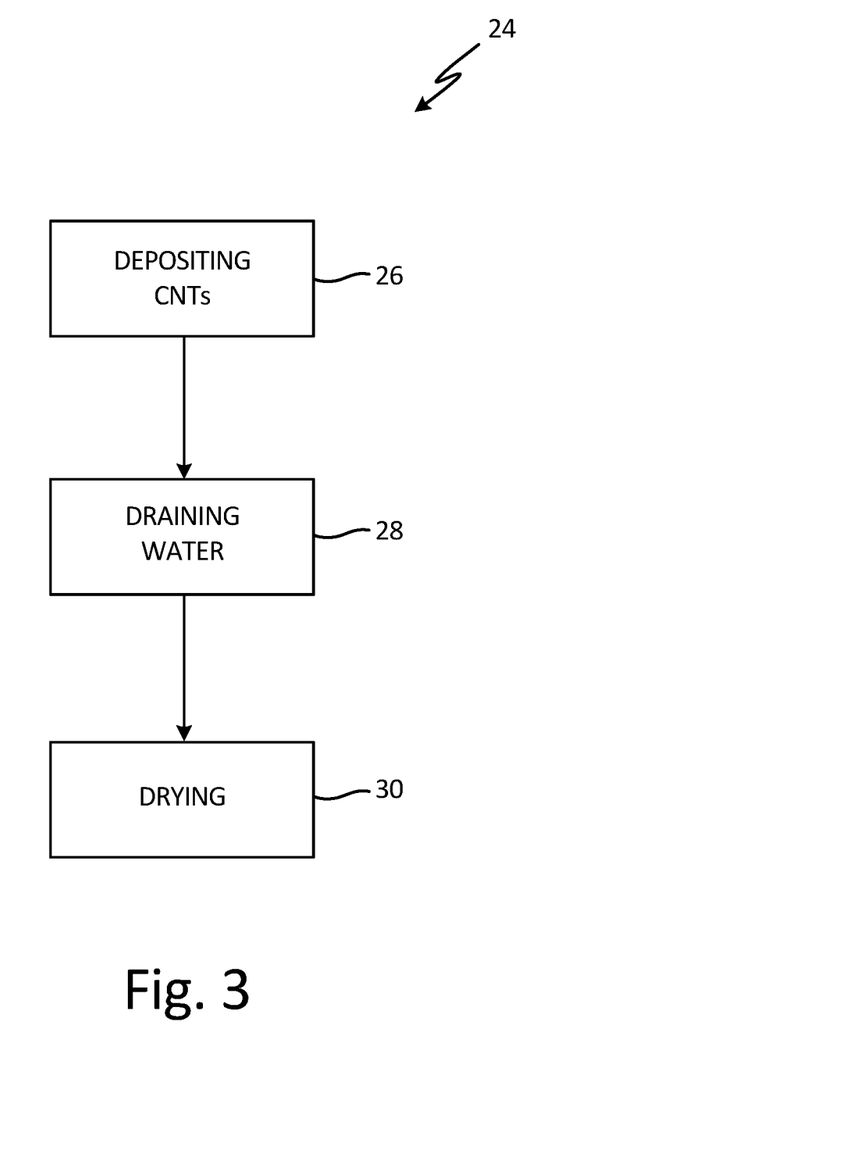
FIG. 3 is a flow chart depicting a method of making a carbon nanotube slurry with complex curvatures.

FIG. 3 is a flow chart depicting method 24 of making a carbon nanotube sheet with complex curvatures for application on aircraft parts, such as complex blades, vanes, engine lips, or other aircraft parts with multiple curvatures. Method 24 includes depositing a CNT mixture in step 26, draining water in step 28, and drying in step 30.

First, in step 26, CNTs are deposited onto a forming surface. The CNTs can be in the form of an aqueous slurry, or a CNT sheet. The forming surface contains at least two curvatures, creating a complex geometric shape as desired. The forming surface can be surrounded by walls if needed. Generally, the forming surface is porous. If the CNT is in the form of a sheet, the sheet may be wetted locally.

Next, in step 28, water (W) is drained from the CNTs. Typically, this is accomplished by forcing water (W) to drain through the porous forming surface. However, other methods, such as heat, evaporation, or alternatives, may be used to remove water from the CNTs. The resulting CNT heater element should be formed to the contours of the forming surface.

Last, in step 30, the resulting CNT sheet is dried in the shape it formed around the forming surface. This can be accomplished through means such as heat. Once the CNT sheet is dry, it can be removed from the forming surface and applied to the desired part. The forming surface can be used again to create more CNT heater elements with complex curvatures.

The resulting CNT heater elements can be large sheets around the size of 1,000 square inches in surface area so that they are useable for large aircraft de-icing surfaces. However, final CNT heater elements can sometimes be applied to much smaller aircraft elements with complex contours, and can range from 4 square inches to 475 square inches in surface area when cut for the appropriate surface. Nonetheless, these CNT heater elements each have a uniform thickness created by method 24.

Carbon nanotube heater elements should have and electrical resistivity between 0.005 ohms per square ($\Omega$/sq) and 3.0 $\Omega$/sq. The resistivity can be tailored depending on the thickness of the CNT heater element. The thickness of each CNT heater element is typically about 0.001" to 0.020", but multiple layers of CNT heater elements can be stacked to create greater thickness and adjust electrical resistivity.

Figure 4A:
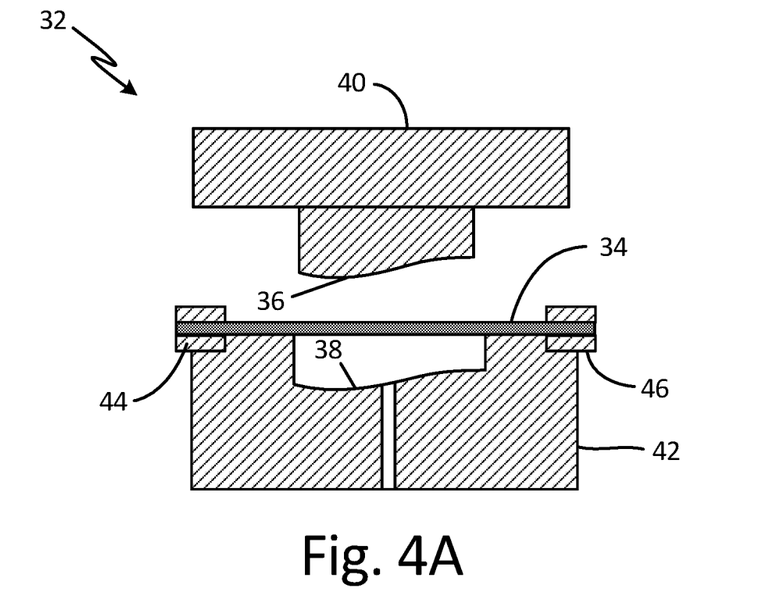
FIGS. 4A-4B are a cross-sectional views of a system for creating complex carbon nanotube sheets with thermoforming.
Figure 4B:
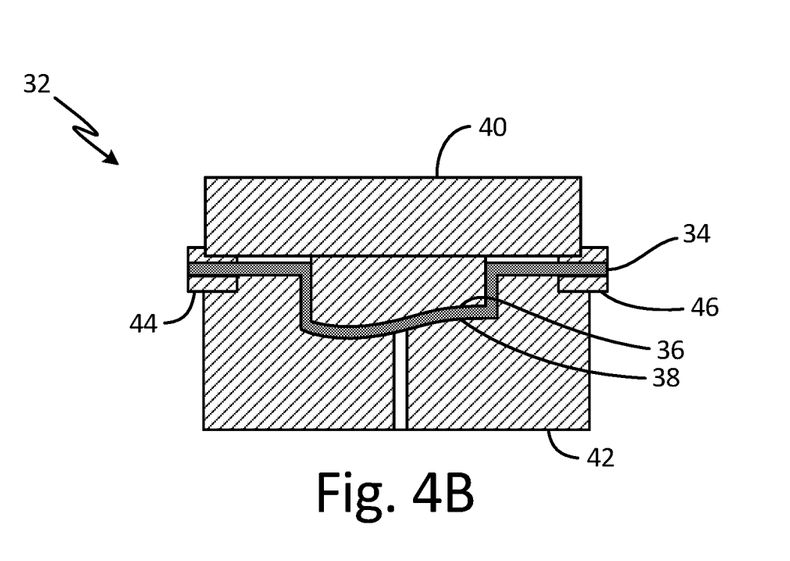

FIGS. 4A and 4B depict another system 32 for forming complex CNT heater elements. In system 32, a CNT sheet can be created by combining CNTs with thermoplastic binders to form a film, CNT sheet 34. System 32 includes forming surfaces 36, 38 on first and second tools 40, 42, and CNT sheet 34 mounted between holders 44, 46.

In system 32, CNT sheet 34 contains thermoplastic binders such as polyetherether ketones, polyetherimides, polyethlylenes, polyether sulfones, nylon, polyethylene-naphthalates, polybenzimidazole, polyimides, and poly methyl methacrylates. The thermoplastic binders are mixed in with carbon nanotubes in sheet 34, resulting in more pliability when heat is applied to sheet 34. Sheet 34 is suspending between first and second tools 40, 42 by holders 44, 46 such that when tools 40 and 42 are brought together, sheet 34 is pressed to curved forming surfaces 36, 38.

Sheet 42 can be heated to a pliable temperature prior to application to forming surfaces 36, 38. Heating can be done in an oven and forming the CNT element can be performed with in a press or under vacuum. The heat in combination with pressure from tools 40, 42 make CNT sheet 34 into a CNT heater element with a complex curvature. Preferably, no large deformation occurs with the thermoplastic binder containing CNT sheets.

Figure 5:
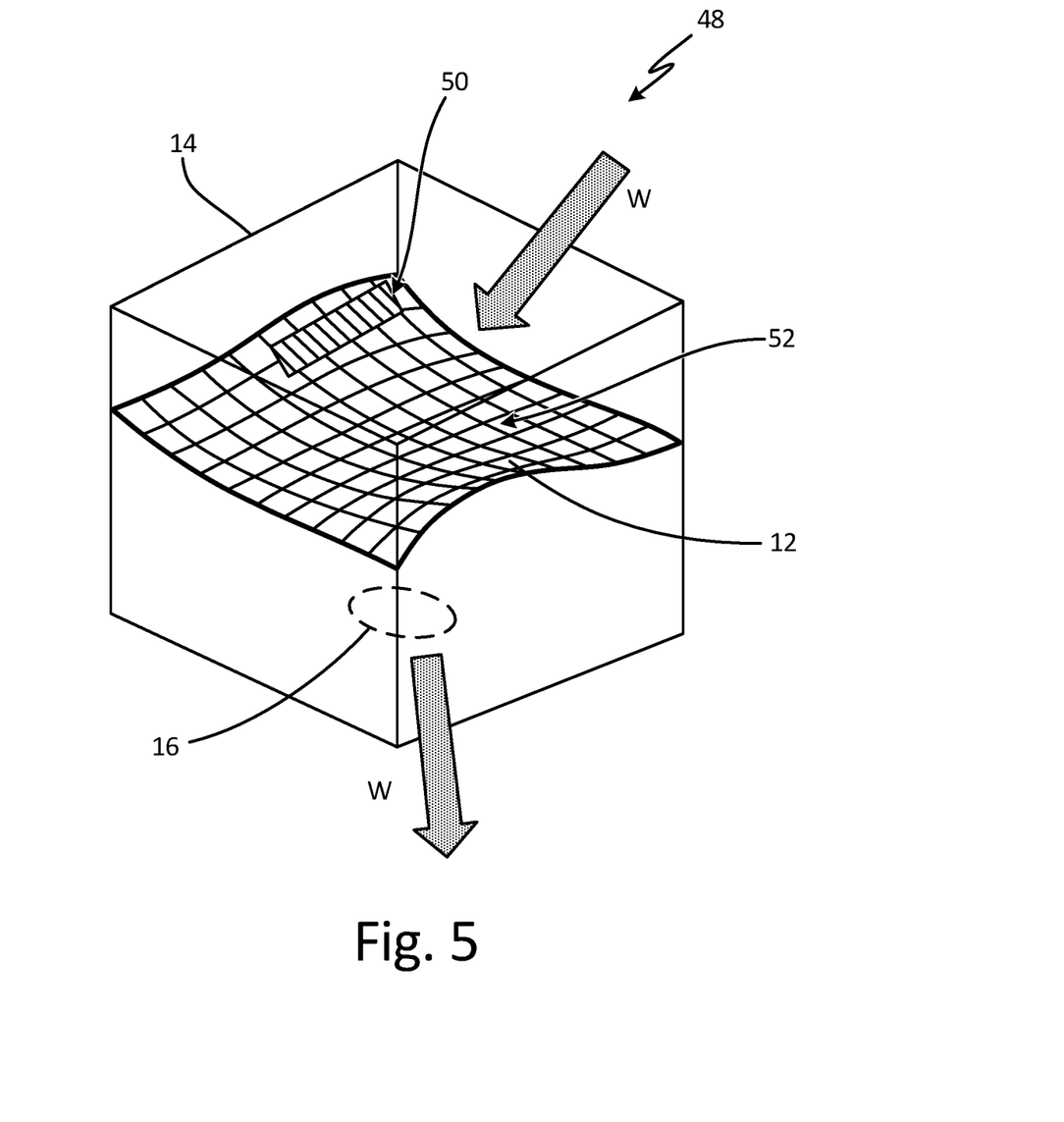
FIG. 5 is a perspective view of a system for creating complex carbon nanotube sheets with bus bar attachments.

FIG. 5 is a perspective view of apparatus 48 for creating complex carbon nanotube sheets with bus bar attachments. Apparatus 48 is similar to apparatus 10 of FIG. 1, and includes the same components, but also includes a bus bar attachment 50 on CNT layer 52. Bus bar attachment 50 can be added to CNT layer 52 while CNT layer 52 is still on apparatus 48, or after CNT layer 52 has been removed from apparatus 48.

Bus bar attachment 50 includes a bus bar, a coupling agent, a conductive adhesive layer, and a pre-impregnated (pre-preg) glass fabric layer. The bus bar is a metallic strip or bar that conducts electric current and creates an electrical connection to a resulting complex CNT layer 52. The bus bar may be made of copper, brass, or other appropriate conductive metals or alloys.

The bus bar is connected to CNT layer 52 after CNT layer 52 has been formed into a complex shape and dried through a conductive adhesive layer. The conductive adhesive layer is a thermal cycle resistant adhesive, thus the conductive adhesive resists the thermal stress from thermal cycling and conducts electricity. Alternatively, direct deposition of copper or metal onto CNT layer 52 can be used.

A pre-preg glass fabric is attached to the bus bar on the side opposite CNT sheet 52. A pre-preg glass fabric is a preimpregnated composite glass fiber that has been impregnated with a resin system (typically epoxy). The pre-preg glass fabric can be a commercially available pre-preg glass fabrics. The pre-preg glass fabric allows for bus bar attachment 50 to be protected from delamination due to mechanical stresses and also provides electrical insulation on this area that may be susceptible to electrical shorting due to the protrusion formed by the lead attachment.

Bus bars attached to CNT heaters can be integrated to the heater and allow for electrical connection from the CNT heater through a bus bar to outside electronics. Bus bars can be attached to CNT layer 52 by perforating a portion of the bus bar, applying a coupling agent and a conductive adhesive to securely attach the bus bar to the CNT heater, and applying a pre-preg glass fabric to protect the bus bar. Wires can be soldered to the bus bar to create an external electrical connection. Alternatively, a bus bar can be applied through metal deposition onto CNT layer 52.

This method creates CNT sheets that are ready to embed in a structure with the same curvatures as the CNT sheets, resulting in more effective electrical heating and ice protection. This overcomes sheet draping problems that have previously resulted in cutting or overlapping of CNT heaters, varying resistivity and caused uneven ice protection. Additionally, CNT heaters are lightweight, compatible with composite materials, and have uniform resistance throughout.

Discussion of Possible Embodiments

The following are non-exclusive descriptions of possible embodiments of the present invention.

A method of making a carbon nanotube heater element includes depositing carbon nanotubes onto a forming surface that has a complex shape, and treating the carbon nanotubes such that the carbon nanotubes form a complex shape reflecting the complex shape of the forming surface.

Treating the carbon nanotubes includes mixing the carbon nanotubes with a thermoplastic binder to create a carbon nanotube sheet prior to forming the carbon nanotubes onto the forming surface, and thermoforming the carbon nanotube sheet onto the forming surface.

Thermoforming the carbon nanotube sheet comprises applying force and heat to the carbon nanotube sheet.

The thermoplastic binder is selected from the group consisting of polyetherether ketones, polyetherimides, polyethlylenes, polyether sulfones, nylon, polyethylene-naphthalates, polybenzimidazole, polyimides, poly methyl methacrylates and combinations thereof.

Treating the carbon nanotubes includes draining water from the carbon nanotubes to form a carbon nanotube heater element on the forming surface, and drying the carbon nanotube heater element.

Depositing carbon nanotubes comprises pouring an aqueous carbon nanotube slurry onto the forming surface.

Depositing carbon nanotubes comprises placing a pre-made carbon nanotube sheet on to the forming surface and adding water to one or more portions of the carbon nanotube sheet.

The forming surface is porous.

Draining water from the carbon nanotubes comprises gravitational draining.

The complex shape of the forming surface includes at least two different curvatures.

The method includes attaching a bus bar to the carbon nanotube heater element.

Attaching the bus bar includes depositing a metal onto the carbon nanotube heater element.

Attaching the bus bar includes perforating a portion of a bus bar, treating the bus bar with a coupling agent, applying a conductive adhesive to the bus bar, wherein the coupling agent forms covalent bonds between the bus bar and the conductive adhesive, bonding the bus bar into the carbon nanotube heater with the conductive adhesive, attaching a pre-preg glass fabric to the bus bar, and curing the bus bar such that the bus bar is attached to the pre-preg glass fabric and the CNT sheet.

The method includes soldering wires onto the bus bar, wherein the wires extend through the pre-preg glass fabric.

The pre-preg layer comprises a glass fiber fabric.

A heater element for ice protection includes a thin, monolithic carbon nanotube heater element having a geometric shape with complex curvatures.

The article of the preceding paragraph can optionally include, additionally and/or alternatively, any one or more of the following features, configurations and/or additional components:

The carbon nanotube heater element has a uniform thickness between 0.001 inches and ~0.020 inches.

The carbon nanotube heater element has an electrical resistivity between 0.005 ohms per square and 3.0 ohms per square.

The carbon nanotube heater element has a surface area between 4 square inches and 1,000 square inches.

The heater element includes a bus bar attachment wherein the bus bar attachment comprises a bus bar, a coupling agent, a conductive adhesive layer, and a pre-impregnated glass fabric layer.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of making a carbon nanotube heater comprising:
    depositing carbon nanotubes onto a forming surface that has a complex shape, wherein the complex shape of the forming surface includes at least two different curvatures;
    treating the carbon nanotubes such that the carbon nanotubes form a complex shape reflecting the complex shape of the forming surface; and
    attaching a bus bar to the carbon nanotube heater element, wherein attaching the bus bar comprises:
    perforating a portion of the bus bar;
    treating the bus bar with a coupling agent;
    applying a conductive adhesive to the bus bar, wherein the coupling agent forms covalent bonds between the bus bar and the conductive adhesive;
    bonding the bus bar into the carbon nanotube heater with the conductive adhesive;
    attaching a pre-preg glass fabric to the bus bar; and
    curing the bus bar such that the bus bar is attached to the pre-preg glass fabric and carbon nanotube heater.

2. The method of claim 1, wherein treating the carbon nanotubes comprises:
    mixing the carbon nanotubes with a thermoplastic binder to create a carbon nanotube sheet prior to depositing the carbon nanotubes onto the forming surface; and
    thermoforming the carbon nanotube sheet onto the forming surface.

3. The method of claim 2, wherein thermoforming the carbon nanotube sheet comprises applying force and heat to the carbon nanotube sheet.

4. The method of claim 2, wherein the thermoplastic binder is selected from the group consisting of polyetherether ketones, polyetherimides, polyethlylenes, polyether sulfones, nylon, polyethylene-naphthalates, polybenzimidazole, polyimides, poly methyl methacrylates and combinations thereof.

5. The method of claim 1, wherein treating the carbon nanotubes comprises:
    draining water from the carbon nanotubes to form a carbon nanotube heater element on the forming surface; and
    drying the carbon nanotube heater element.

6. The method of claim 5, wherein depositing carbon nanotubes comprises pouring an aqueous carbon nanotube slurry onto the forming surface.

7. The method of claim 5, wherein depositing carbon nanotubes comprises placing a pre-made carbon nanotube sheet on to the forming surface and adding water to one or more portions of the carbon nanotube sheet.

8. The method of claim 5, wherein the forming surface is porous.

9. The method of claim 5, wherein draining water from the carbon nanotubes comprises gravitational draining.

10. The method of claim 1, wherein attaching the bus bar comprises depositing a metal onto the carbon nanotube heater element.

11. The method of claim 1, further comprising soldering wires onto the bus bar, wherein the wires extend through the pre-preg glass fabric.

12. The method of claim 1, wherein the pre-preg layer comprises a glass fiber fabric.

13. A heater element for ice protection comprising:
a monolithic carbon nanotube heater element having a uniform thickness and a geometric shape with complex curvatures, wherein the geometric shape with complex curvatures includes at least two different curvatures,
a bus bar attachment, wherein the bus bar attachment includes a perforated section, and wherein the bus bar attachment is attached to the carbon nanotube heater element with a coupling agent and a conductive adhesive, and
a pre-preg glass fabric, wherein the pre-preg glass fabric is attached to the carbon nanotube heater element.

14. The heater element of claim 13, wherein the carbon nanotube heater element has a uniform thickness between 0.001 inches and about 0.020 inches.

15. The heater element of claim 13, wherein the carbon nanotube heater element has an electrical resistivity between 0.005 ohms per square and 3.0 ohms per square.

16. The heater element of claim 13, wherein the carbon nanotube heater element has a surface area between 4 square inches and 1,000 square inches.

* * * * *